May 20, 1969   C. P. AMBULOS ET AL   3,445,800
MEANS AND METHOD FOR WATERPROOFING STRAIN GAUGES
Filed Sept. 28, 1966

United States Patent Office 3,445,800
Patented May 20, 1969

3,445,800
MEANS AND METHOD FOR WATERPROOFING STRAIN GAUGES
Charles P. Ambulos, Niantic, Albert H. Romboni, Mystic, and Bernard S. Willard, Jr., Oakdale, Conn., assignors to General Dynamics Corporation, New York, N.Y., a corporation of Delaware
Filed Sept. 28, 1966, Ser. No. 582,734
Int. Cl. G01l 1/22
U.S. Cl. 338—2                           5 Claims

ABSTRACT OF THE DISCLOSURE

A means and method for waterproofing strain gauges under severe hydrostatic pressures is provided, comprising a hemispherical rubber or rubber-like boot placed over the strain gauge with a hemispherical cavity filled with a dielectric fluid surrounding the gauge itself. The fluid may be inserted in the cavity by means of a hypodermic needle. The hemispherical shape provides balanced stresses all around the boot.

---

The present invention is directed to a means and method for waterproofing strain gauges and other types of electrical transducers carried on the exposed portions of deeply submerged marine structures and vessels which are subjected to severe hydrostatic pressures in excess of 1,000 pounds per square inch. The present invention finds particular application on deep-diving marine vessels, such as the Aluminaut and the Alvin, which operate in water depths ranging up to several miles.

In deep-diving marine vessels it is of crucial importance that the mechanical stresses to which the hull of the vessel is exposed be constantly monitored in order to ensure that they do not exceed the design specifications of the craft. In conventional submarines and other subsurface marine vessels, which are designed for operation at relatively nominal depths not exceeding several hundred feet, ordinary waterproofing techniques are satisfactory for protecting strain gauges and other electrical transducer instrumentation mounted on the exposed hull of the vessel. One waterproofing method in wide use at the present time by the U.S. Navy involves the formation of a patch covering the strain gauge or other transducer element mounted on the hull of the vessel. This protective covering is fabricated from a waterproof curing compound comprised of a liquid rubber cement and a hot plastic (Navy Hot Plastic Formula No. 89) designated as Barrier-Coat, in accordance with Pitre et al. U.S. Patent No. 2,579,610, granted Dec. 25, 1951. However, at the extreme water depths (2000 feet or more) contemplated within the fields of application of the present invention, such conventional waterproofing techniques are not entirely satisfactory because of the insidious breakdown and seepage of water through the protective coating, which eventually causes shorting of the transducer element. Also the protective patch is exceedingly vulnerable to breakage or loosening when impact is made with other objects.

In the present invention the strain gauge or other electrical transducer element, which is secured to the exposed surface of a marine structure subject to severe hydrostatic pressure, is waterproofed and protected by means of a dielectric boot formed of a hemispherically-shaped rubber-like enclosure which surrounds the gauge and is sealed to the structural surface on which the gauge is mounted. The interior cavity of the hemisphere of the boot is completely filled with a dielectric liquid, that is a liquid which possesses suitable electrically-insulating properties, so that the exposed surfaces of the strain gauge are immersed therein. The electrical leads of the strain gauge are brought out through the liquid filled cavity to a terminal block in the boot which in turn connects to a waterproof cable termination integrally formed in the side of the enclosure for electrical linkage of the gauge to external instrumentation. Thus, in the described arrangement, the strain gauge is well protected from both water entry and physical injury by the waterproof buffer medium provided by the dielectric boot.

It is, therefore, a principal objective of the present invention to provide a means and method for water-proofing and preserving strain gauges and other types of electrically-tranducing instrumentation which are deployed on the exposed surface of marine vessels and structures subjected to severe hydrostatic pressures.

It is a further objective of the present invention to provide a waterproofing means of the type herein described which is capable of expeditious and simple application and removal.

It is a still further objective of the present invention to provide a sealing means, in the form of a rubber-like boot filled with dielectric or electrically-insulating liquid, for waterproofing and protecting strain gauges and other electrical transducer instrumentation mounted on the exposed surface of marine vessels and structures which are to be operated or located in water depths in excess of twenty-two hundred feet (equivalent to water pressures in excess of 1,000 p.s.i.).

The foregoing and other objectives, features, and advantages of the present invention will be more readily understood upon consideration of the following detailed description of the invention, taken in conjunction with the accompanying drawings.

Figure 1:
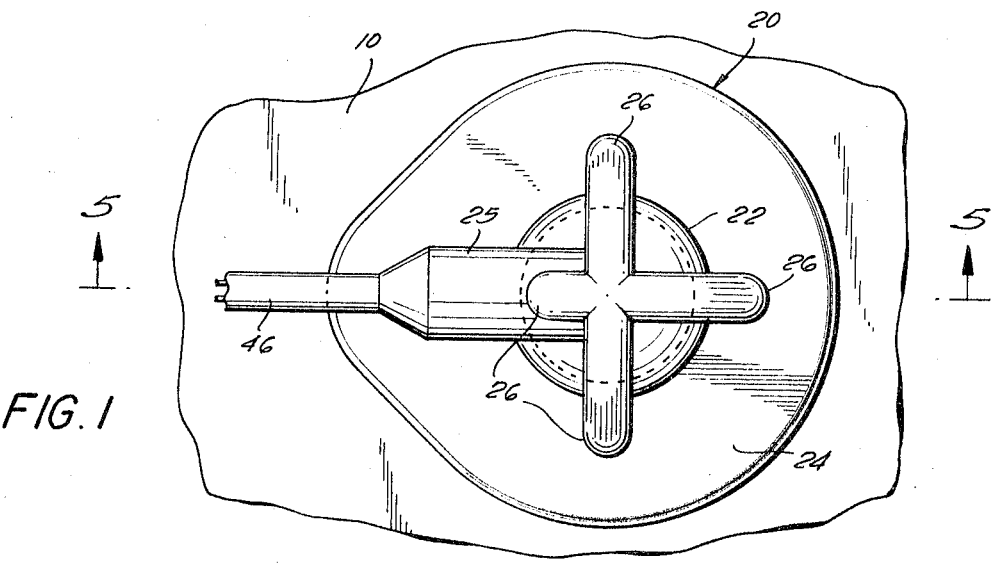
FIG. 1 is a top plan view of an illustrative embodiment of the dielectric boot of the present invention.
Figures 2, 3:
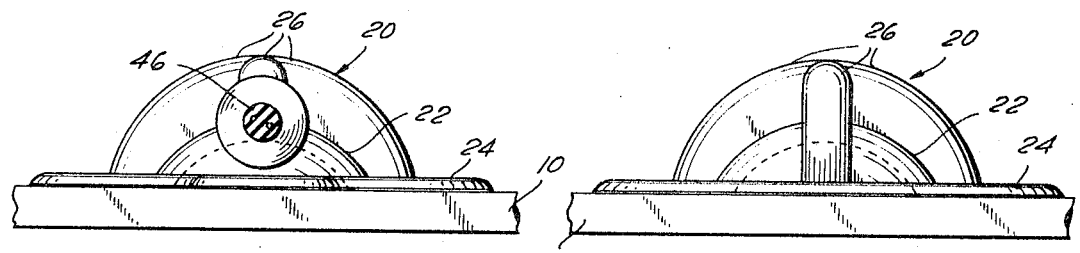
FIG. 2 is a rear elevational view of the dielectric boot embodiment shown in FIG. 1.
FIG. 3 is a front elevational view of the dielectric boot of FIG. 1.

Referring to the figures, there is shown an exposed surface section 10 of a submersible marine vessel or structure on which is mounted the dielectric boot 20 of the present invention enclosing, waterproofing and protecting a strain gauge or electrical transducer element 50. The strain gauge element 50, whose electrical resistance changes in proportion to the mechanical strain imposed on the object under test upon the application of load, is a conventional element forming no part of the present invention. Typical strain gauges for use in connection with the dielectric boot of the present invention comprise a metal foil grid or bonded filament embedded in a thin rectangular backing of approximately postage samp size.

The dielectric boot 20 comprises a hemispherically-shaped enclosure 22 of hard rubber or rubber-like material such as neoprene or nitrile compound material, surrounded by a peripheral flange 24 and surmounted by a quadrant arrangement of projecting ribs 26 which serve to protect the casing from physical injury caused by contact with other objects. The boot enclosure is sealed to the surface 10 by a waterproof bonding adhesive 30 which will bond solidly to both rubber (or rubber-like) material and metal, such as Epon 934 adhesive epoxy manufactured by Shell Chemical Company of Pittsburg, Calif. Circular suction rings 28 are preferably provided on the bottom surface of the flange portion 24 in order to strengthen the seal of the boot to the support surface 10.

The electrical leads 52 from the strain gauge 50 are brought up inside the hollow hemispherical cavity 29 formed in the interior of the boot and connected to a terminal block 40 located in the center of the boot hemisphere 22. From the terminal block 40 heavier conductor wires 42 are brought out through a pre-molded cable termination 44 to connect with a waterproof cable conductor 46 which extends out from a jacket 25 integrally formed in the side of the hemisphere 22 and which serves to electrically link the strain gauge element 50 to instrumentation external of the boot.

In installation, the strain gauge element 50 is first cemented with a suitable adhesive, such as methyl-2-cyanoacrylate manufactured by the Tennessee Eastman Company in Kingsport, Tenn. and sold as Eastman 910 cement, to the structure 10 and the protective boot 20 then positioned over the strain gauge. Ideally, the gauge should lie in the center of the hemispherical enclosure, and the boot is next bonded to the structure 10 at its flange 24 in the manner previously described. The internal cavity 29 of the hemispherical enclosure is next filled with a suitable dielectric or electrically-insulating liquid 35, such as C-3400 transformer oil or polybutylene polymer.

Figure 5:
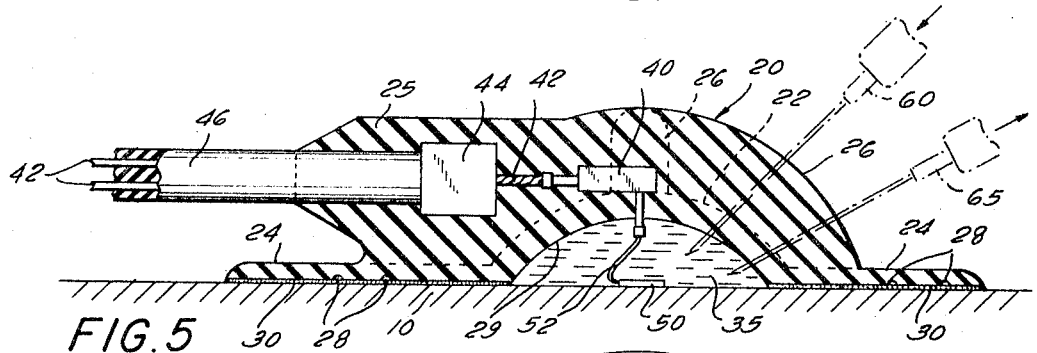
FIG. 5 is an enlarged side sectional view, taken along the line 5—5 in FIG. 1, showing the method of insertion of the dielectric liquid into the boot.
Figure 4:
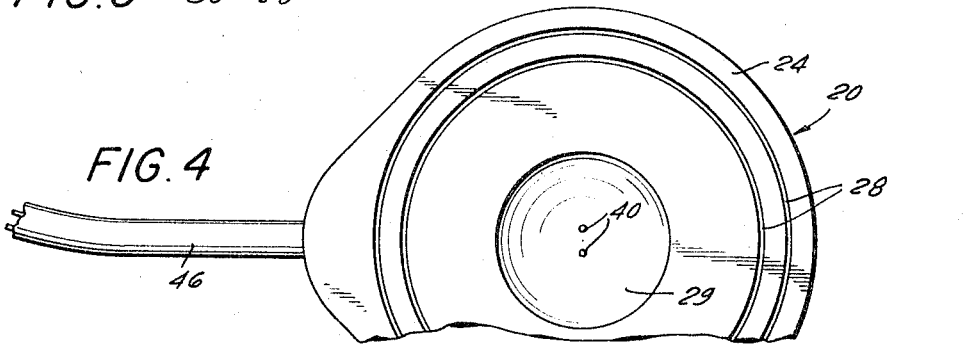
FIG. 4 is a bottom view, partially fragmentary, of the dielectric boot embodiment of FIG. 1.

One satisfactory method of accomplishing the filling of the boot 10 with the dielectric liquid 35 is shown in FIG. 5. Two hypodermic needles 60, 65 are inserted through the rubber-like material forming the hemispherical enclosure 22 of the boot with their terminal outlets projecting into the cavity 29. Through one of the needles 60 the dielectric liquid 35 is forced under pressure into the internal cavity 29 in the boot enclosure. The other hypodermic needle 65 provides a means for withdrawing the air from the void as the cavity is filled with the liquid. After the cavity has been completely filled with dielectric liquid 35, the needles 60, 65 are removed and the openings in the boot are tightly sealed off to prevent flow in either direction under the severe hydrostatic pressures which the boot would encounter in use.

A suitable alternative method to employing hypodermic needles for the filling of the cavity with dielectric liquid might be the provision of a pair of integral tubes connecting the interior cavity 29 of the boot to the outside. One tube would be used to pump the dielectric liquid in; the other, to allow the displaced air to escape. In similar manner, after the hemispherical cavity had been completely filled with liquid, the outside ends of the tubes would then be sealed off.

A modification in the method of filling the hemispherical cavity of the dielectric boot of the present invention involves the use of a suitable dielectric gel or grease compound having low water absorption and low conductivity, such as Insulgrease G-624 manufactured by the General Electric Company in Waterford, N.Y., in place of the dielectric liquid. The gel, which would be in semisolid form, could be packed tightly into the cavity before the bonding of the boot to the structure, and thus would eliminate the need for injection of the dielectric substance into the cavity after the bonding step.

The terms and expressions which have been employed here are used as terms of description and not of limitation, and there is no intention, in the use of such terms and expressions, of excluding equivalents of the features shown and described, or portions thereof, it being recognized that various modifications are possible within the scope of the invention claimed.

What is claimed is:
1. A means for waterproofing and protecting a strain gauge or similar type of electrical transducer instrumentation carried on the exposed portion of a marine structure which is to be subjected to severe hydrostatic pressures comprising,
   (a) a hemispherical boot of semi-rigid rubber-like material positioned to completely surround said gauge and securely sealed by a bonding agent to the surface of said structure on which said gauge is mounted, thereby forming an enclosed hemispherical cavity over said gauge,
   (b) a dielectric liquid completely filling said cavity and in contact with said gauge,
   (c) a termination for a cable connector,
   (d) a waterproof jacket casing formed in the side of said boot enclosing and protecting said cable termination, and
   (e) a terminal block in said boot providing an electrical juncture for connecting wire leads from said gauge to conductor ends of said cable termination.

2. The means set forth in claim 1 further characterized in that said boot is comprised of neoprene, is in the shape of a hemisphere surounded by a peripheral flange for sealing engagement of said boot to said structure, and is provided with projecting bumper means on the outer surface of said hemisphere to protect said boot from injury caused by contact with other objects.

3. A method for waterproofing and protecting a strain gauge or similar type of electrical transducer instrumentation carried on the exposed portion of a marine structure which is to be subjected to severe hydrostatic pressures comprising, the steps of, placing a boot formed of semi-rigid rubber-like material over said gauge, connecting leadwires from said gauge to a cable premolded in said boot, securely sealing the sides of said boot to the surrounding surface of said structure on which said gauge is mounted, thereby forming an enclosed cavity over said gauge, and then introducing a dielectric liquid into said cavity while simultaneously withdrawing air therefrom until said cavity is completely filled with said dielectric liquid.

4. The method set forth in claim 3 further characterized in that said last-mentioned step is effected by penetrating through the thickness of said boot and into said cavity with at least a pair of hypodermic needles, and introducing said dielectric liquid into said cavity via one of said needles, while simultaneously withdrawing air therefrom via the other of said needles, and thereafter tightly sealing off the puncture points made by said needles.

5. The method set forth in claim 3 wherein said dielectric liquid substantially comprises a polybutene polymer.

References Cited

UNITED STATES PATENTS

| | | | |
|---|---|---|---|
| 2,423,842 | 7/1947 | McHenry | 338—2 X |
| 3,089,107 | 5/1963 | Dean | 338—2 |
| 3,245,200 | 4/1966 | Shaw. | |

OTHER REFERENCES

The Strain Gage Primer by C. C. Perry and H. R. Lissner, 2nd ed., 1962, McGraw Hill Book, New York, pp. 175–182.

REUBEN EPSTEIN, *Primary Examiner.*

U.S. Cl. X.R.

53—36; 114—1; 156—145; 29—593